(12) United States Patent
Zhao

(10) Patent No.: US 10,274,710 B2
(45) Date of Patent: Apr. 30, 2019

(54) REAR-PROJECTION DISPLAY SYSTEM AND REAR-PROJECTION SCREEN

(71) Applicant: Hisense Co., Ltd., Qingdao (CN)

(72) Inventor: Fei Zhao, Qingdao (CN)

(73) Assignees: Hisense Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 5 days.

(21) Appl. No.: 15/601,179

(22) Filed: May 22, 2017

(65) Prior Publication Data

US 2017/0255086 A1 Sep. 7, 2017

(30) Foreign Application Priority Data

Oct. 31, 2016 (CN) .......................... 2016 1 0970213

(51) Int. Cl.
| | |
|---|---|
| *G02B 17/08* | (2006.01) |
| *G03B 21/625* | (2014.01) |
| *G03B 21/10* | (2006.01) |
| *G02B 3/08* | (2006.01) |
| *G02B 3/00* | (2006.01) |

(52) U.S. Cl.
CPC ............. *G02B 17/08* (2013.01); *G03B 21/10* (2013.01); *G03B 21/625* (2013.01); *G02B 3/0056* (2013.01); *G02B 3/08* (2013.01)

(58) Field of Classification Search
CPC .................................................... G03B 21/625
USPC ........................................ 353/77–79, 98–99
See application file for complete search history.

(56) References Cited

U.S. PATENT DOCUMENTS

| | | | |
|---|---|---|---|
| 2003/0137729 A1 | 7/2003 | Goto et al. | |
| 2004/0257652 A1* | 12/2004 | Peterson | G02B 3/08 |
| | | | 359/460 |
| 2005/0237610 A1* | 10/2005 | Sekiguchi | G03B 21/10 |
| | | | 359/457 |
| 2007/0146877 A1* | 6/2007 | Imafuku | G02B 3/08 |
| | | | 359/457 |

(Continued)

FOREIGN PATENT DOCUMENTS

| | | |
|---|---|---|
| CN | 103809361 | 5/2014 |
| JP | H0928530 | 2/1997 |

OTHER PUBLICATIONS

Office Action from corresponding Chinese Application No. 201610970213.6 dated Jan. 4, 2018 (5 pages).

*Primary Examiner* — Christopher E Mahoney
(74) *Attorney, Agent, or Firm* — Harness, Dickey & Peirce, P.L.C.

(57) ABSTRACT

A rear-projection display system and a rear-projection screen are provided. The system includes a projector, N light path turning systems, and a rear-projection screen, wherein the rear-projection screen includes a collimation lens layer including a target region and a Fresnel lens region; the projector is configured to emit first projected light which is incident directly onto the Fresnel lens region, and emit second projected light which is incident onto the N light path turning system; and the N light path turning systems are configured to receive the second projected light from the projector, and to have the second projected light incident onto the target region at a first angle less than the emitting angle of the second projected light.

18 Claims, 4 Drawing Sheets

(56) References Cited

U.S. PATENT DOCUMENTS

2008/0007827 A1\* 1/2008 Kinoshita .............. G03B 21/10
　　　　　　　　　　　　　　　　　　　　　　 359/446
2009/0296049 A1\* 12/2009 Teradaira ............... G02B 13/22
　　　　　　　　　　　　　　　　　　　　　　 353/98

\* cited by examiner

REAR-PROJECTION DISPLAY SYSTEM AND REAR-PROJECTION SCREEN

CROSS-REFERENCE TO RELATED APPLICATION

This application claims the benefit and priority of Chinese Patent Application No. 201610970213.6 filed Oct. 31, 2016. The entire disclosure of the above application is incorporated herein by reference.

FIELD

This disclosure relates to the field of projection display technologies, and particularly to a rear-projection display system and a rear-projection screen.

BACKGROUND

This section provides background information related to the present disclosure which is not necessarily prior art.

In the field of rear-projection displays, generally a rear-projection screen with a Fresnel micro-lens structure is adopted. Optical tests on the rear-projection screen with the Fresnel micro-lens in the field of rear-projection displays showed that even if there is good luminance uniformity of light emitted by a projector itself, then the luminance uniformity of the light passing the rear-projection screen may be altered because there is such a gain to light beams on the screen itself that they are actually perceived by human eyes as the luminance of the light, which is emitted by the projector, and to which the gain is applied.

SUMMARY

This section provides a general summary of the disclosure, and is not a comprehensive disclosure of its full scope or all of its features.

This disclosure provides a rear-projection display system and a rear-projection screen so as to improve the uniformity of light on the rear-projection screen in the rear-projection display system.

In one aspect, some embodiments of this disclosure provides a rear-projection display system including a projector, N light path turning systems, and a rear-projection screen, wherein N is a positive integer;

the rear-projection screen includes a collimation lens layer including a target region and a Fresnel lens region, wherein the target region is arranged outside the Fresnel lens region; and emergent light exiting the target region is parallel to the normal of the collimation lens layer;

the projector is configured to emit first projected light which is incident directly onto the Fresnel lens region, and emit second projected light which is incident onto the N light path turning systems, wherein an emitting angle of the first projected light is lower than a first preset threshold, and an emitting angle of the second projected light is above or equal to the first preset threshold, the emitting angle is an angle between the projected light emitted by the projector, and an optical axis of the projector; and the N light path turning systems are configured to receive the second projected light emitted by the projector, and to have the second projected light incident onto the target region at a first angle less than the emitting angle of the second projected light.

In another aspect, some embodiments of this disclosure further provide a rear-projection screen including:

a collimation lens layer including a target region and a Fresnel lens region, wherein the Fresnel lens region receives first projected light directly from a projector, and the target region receives second projected light from the projector processed by N light path turning systems, wherein the target region is arranged outside the Fresnel lens region, and emergent light exiting the target region is parallel to the normal of the collimation lens layer;

wherein an emitting angle of the first projected light is lower than a first preset threshold, and an emitting angle of the second projected light is above or equal to the first preset threshold, and the second projected light processed by the N light path turning systems is incident onto the target region at a first angle less than the emitting angle of the second projected light.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
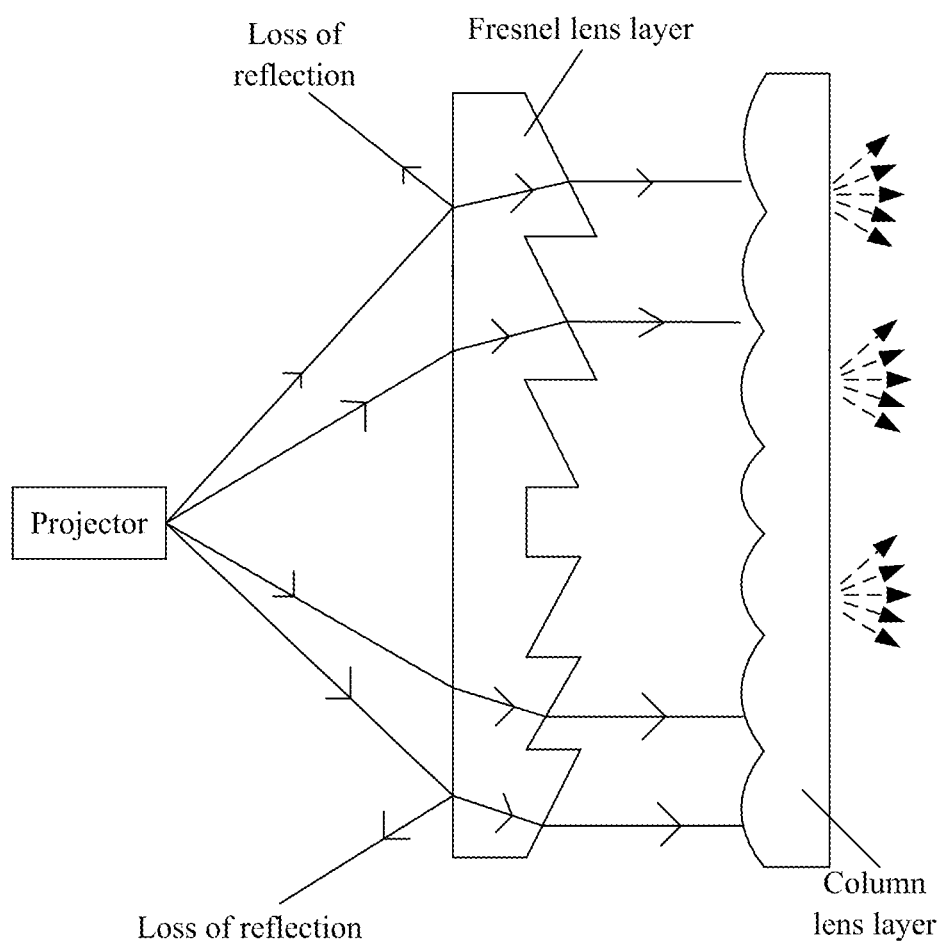
FIG. 1 is a schematic diagram of a rear-projection display system in the related art.

As illustrated in FIG. 1, there is a schematic diagram of a rear-projection display system in the related art, where a rear-projection screen is a Fresnel lens screen which refers to an optical screen including a Fresnel lens layer configured to converge and collimate incident light of a projector into parallel emergent light transmitted to an optical lens layer located behind the Fresnel lens layer. As illustrated in FIG. 1, the light exiting the Fresnel lens layer is transmitted to a column lens layer in the horizontal direction, and convex lens components in the column lens layer receive and converge the collimated light, image it onto the focus plane of the convex lenses, so that the light which is converged and then diverged exit from the column lens layer, thus entering human eyes.

In the rear-projection screen structure with the Fresnel micro-lens, the light, emitted by the projector, may be reflected on the surface of the Fresnel lens layer while passing the Fresnel lens layer, thus resulting in such a loss of energy that increases with an increasing angle of the incident light. For example, given the projector with a projection ratio ranging from 0.6 to 0.7, a loss of energy on the edge of the rear-projection screen is typically higher than that at the center thereof by a factor of approximately 20%, and the shorter a focus distance of the projector is (i.e., the larger an angle of the incident light), the worse the uniformity of luminance throughout the rear-projection screen resulting from such energy loss.

Figure 2:
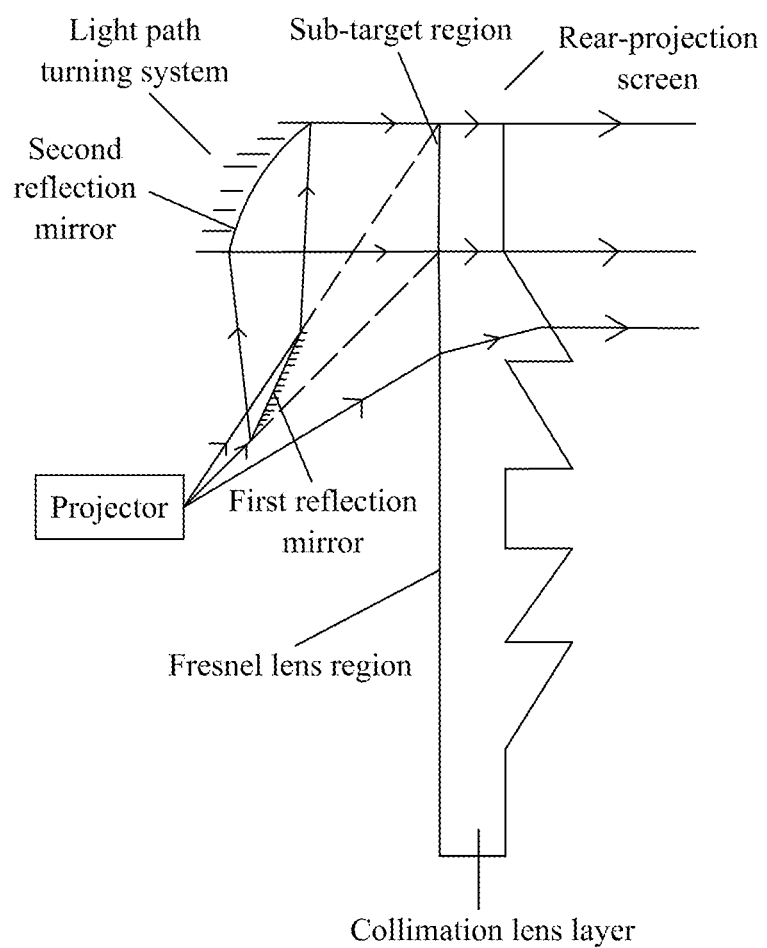
FIG. 2 is a schematic diagram of a rear-projection display system in accordance with some embodiments of this disclosure.

As illustrated in FIG. 2, some embodiments of this disclosure provides a rear-projection display system, which includes a projector, N light path turning systems, and a rear-projection screen, where N is a positive integer;

Where the rear-projection screen includes a collimation lens layer including a target region and a Fresnel lens region, where the target region is arranged outside the Fresnel lens region; and emergent light exiting the target region is parallel to the normal of the collimation lens layer; and Where the Fresnel lens region is a region where projected light emitted from the projector is incident directly at an incidence angle below a preset threshold.

The projector is configured to emit first projected light which is incident directly onto the Fresnel lens region, and emit second projected light which is incident onto the N light path turning systems. The emitting angle of the first projected light is below a first threshold, and the emitting angle of the second projected light is above or equal to the first preset threshold, where the emitting angle is an angle between the projected light of the projector, and an optical axis of the projector.

The N light path turning systems are configured to receive the second projected light emitted by the projector, and to have the second projected light incident onto the target region at a first angle less than the emitting angle of the second projected light. The second projected light exiting the N light path turning systems is distributed uniformly in the target region, and the first projected light is distributed uniformly in the Fresnel region. The second projected light is incident onto the target region at a position at such a distance from the center of the projection screen that increases with the increasing angle thereof, and the first projected light is incident onto the Fresnel region at a position at such a distance from the center of the projection screen that increases with the increasing angle thereof. Light with the largest emitting angle among the first projected light is projected onto the projection screen at an adjacent position to a position where light with the smallest emitting angle among the second projected light is projected onto the projection screen, so that a projection image on the projection screen is distributed consecutively at the boundary of the two regions without being split.

In the embodiments disclosed above, the N light path turning systems are introduced to the rear-projection display system, so that the propagation path of the second projected light from the projector is altered by the light path turning system, and further the second projected light processed by the light path turning system can be incident onto the target region of the collimation lens layer at the first angle less than the emitting angle of the second projected light emitted from the projector. Due to the less angle of the light incident onto the target region, there may be a less loss of reflection for the incident light, thus improving the uniformity of luminance throughout the rear-projection screen. Since the emergent light exiting the target region of the collimation lens layer is parallel to the normal of the collimation lens layer, and the Fresnel lens region in the collimation lens layer can also have the light passing the Fresnel lens region exit parallel to the normal of the collimation lens layer, therefore the collimation lens layer can have the light passing through the collimation lens layer (either the target region on the collimation lens layer, or the Fresnel lens region on the collimation lens layer) can exit parallel to the normal of the collimation lens layer, thus guaranteeing the accuracy of the light exiting the collimation lens layer. With the design above of the rear-projection display system, the target region of the collimation lens layer can be optimized to reduce the loss of the reflected light so as to improve the uniformity of luminance of the light emitted throughout the rear-projection screen while guaranteeing the accuracy.

The target region can be arranged at least in the following two schemes:

In a first scheme, when the first angle is 0°, the target region is arranged as a planar transmitting layer.

In other words, the light is incident onto the target region in the vertical direction, where the emergent direction of the light will not be altered by the planar transmitting layer of the target region, but the light also exit perpendicular to the target region.

In a second scheme, when the first angle is more than 0°, the target region is arranged as a Fresnel lens layer.

When the first angle is more than 0°, then since the light incident onto the target region needs to exit in the same direction, the light path needs to be revised by the target region, where the target region can be arranged as a Fresnel lens layer to revise the light so that the light exit perpendicular to the target region.

It shall be noted that when the first angle is more than 0°, then there will be different revision parameters for the Fresnel lens layer arranged in the target region, and the Fresnel lens layer in the Fresnel lens region of the collimation lens layer, for example, the focus length of the Fresnel lens layer in the target region is more than the focus length of the Fresnel lens layer in the Fresnel lens region of the collimation lens layer, When the N light path turning systems turn the light from the projector to the target region of the collimation lens layer to be incident perpendicularly to the target region, then the loss of reflection for the light may be reduced as many as possible, and the uniformity of luminance for the light emitted throughout the rear-projection screen can be improved as much as possible.

Optionally each of the N light path turning systems in the rear-projection display system includes at least two reflection mirrors, for example, each light path turning system includes two reflection mirrors, three reflection mirrors, etc.; or the numbers of reflection mirrors in the respective light path turning systems may different from each other, for example, one light path turning system includes two reflection mirrors, another light path turning system includes four reflection mirrors, etc.

Figure 4:
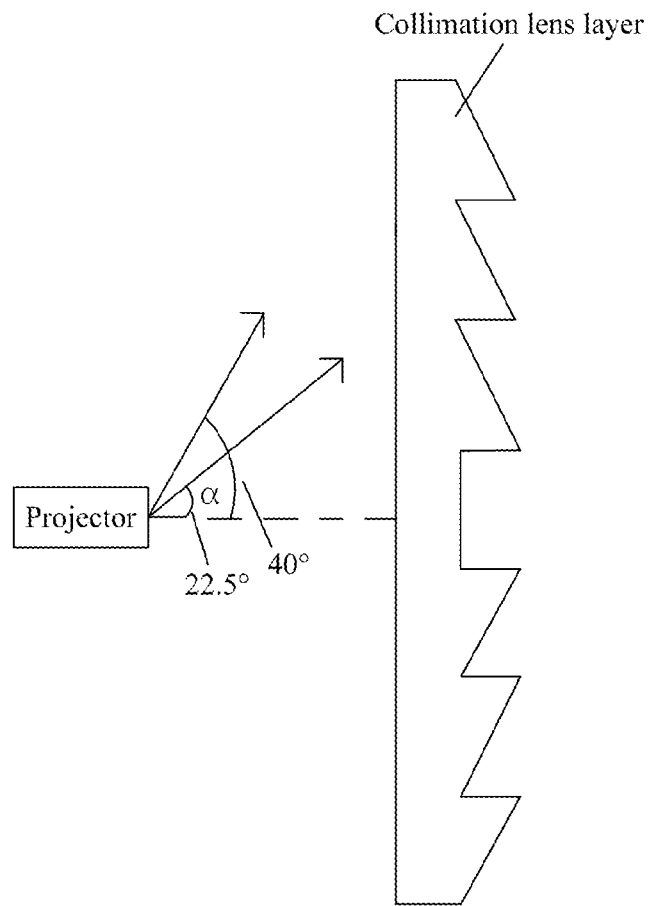
FIG. 4 is a schematic diagram of a light path turning system arrangement in half an angle in accordance with some embodiments of this disclosure.

In some embodiments, the first preset threshold is an emitting angle of the light projected by the projector to the inner edge of the target region. Referring to FIG. 4, the emitting angle is the angle between the projected light of the projector, and the optical axis of the projector, e.g., the angle "α".

In some embodiments, the N light path turning systems each include two reflection mirrors as illustrated in FIG. 2 where there is illustrated a schematic diagram of such one of the N light path turning systems that includes a first reflection mirror and a second reflection mirror (here only two reflection mirrors are illustrated by way of an example), where the first reflection mirror is a planar reflection mirror, and the second reflection mirror is a concave reflection mirror; or alternatively the first reflection mirror is a concave reflection mirror, and the second reflection mirror is a planar reflection mirror (this embodiment will be described by way of an example in which the first reflection mirror is a planar reflection mirror, and the second reflection mirror is a concave reflection mirror).

The first reflection mirror is configured to receive light with an emitting angle in a third angle range among the projected light of the projector, and the second reflection mirror is configured to receive reflected light from the first reflection mirror, and to reflect the reflected light to the target region.

Optionally the third angle range is more than or equal to an emitting angle of light projected by the projector to the inner edge of the target region, and less than or equal to an emitting angle of light projected by the projector to the outer edge of the target region, where the inner edge of the target region is the boundary between the target region and the Fresnel lens region, and the outer edge of the target region is the outer edge of the rear-projection screen.

Here the range of the third angle range is typically dependent upon the projection capability of the projector, the area of the rear-projection screen, and the distance between the projector and the rear-projection screen. For example, referring to FIG. 4, there is a schematic diagram of a light path turning system arrangement in half an angle, where the third angle range is 22.5° to 40°. Of course, the third angle range can be another angle range, and the size thereof may be determined as needed in reality. As illustrated, the largest emitting angle of the first projected light is less than 22.5°, and the emitting angle of the second projected light ranges from 22.5° to 40°.

Referring to FIG. 2, the first reflection mirror reflects the second projected light, projected by the projector, to the second reflection mirror (if there is no light path turning system, then the second projected light may be projected onto a sub-target region in FIG. 2, where the sub-target region is a part of the target region of the collimation lens layer, and corresponds to one of the light path turning systems), and the second reflection mirror further reflects the received reflected light from the first reflection mirror to a sub-target region on the target region of the collimation lens layer, so that the light reflected by the second reflection mirror is incident onto the target region of the collimation lens layer at the first angle (where the first angle is 0°), and the light incident onto the target region of the collimation lens layer can exit without being altered in direction, thus guaranteeing the accuracy of the light exiting the collimation lens layer because the light exiting the collimation lens layer in the rear-projection display system needs to be perpendicular to the direction of the collimation lens layer.

The N light path turning systems, the sub-target regions of the target region, and the projected light of the projector are arranged so that:

A part of the projected light of the projector is projected onto the N light path turning systems, and the N light path turning systems reflect the projected light of the projector onto the sub-target regions of the target region (where the number of sub-target regions is the same as the number of light path turning systems, that is, the N light path turning systems correspond to N sub-target regions, and each of the light path turning systems corresponds to one of the sub-target regions).

For example, when the projector is located on a straight line passing the center of the rear-projection screen, and perpendicular to the rear-projection screen, then the rear-projection display system may include four light path turning systems, and accordingly the target region may include four sub-target regions, where each of the light path turning systems corresponds to one of the sub-target regions. In other words, each light path turning system reflects the projected light of the projector onto the corresponding sub-target region. Optionally the four sub-target regions are edge regions of the collimation lens layer.

In a real application, optionally the projector, the N light path turning systems, and the rear-projection screen are located in a housing, and the N light path turning systems are fixed on the inner wall of the housing.

For the rear-projection display system, when the rear-projection screen, the projector, and the light path turning systems are arranged in a closed housing, then the reflection mirrors in the light path turning systems may be easily fixed on a structural piece of the inner wall of the housing. Since the Fresnel lens structure of the rear-projection screen is a center-symmetric structure, in order to achieve a better effect of improving the uniformity of luminance, optionally at least four light path turning systems are arranged symmetrically around the central axis of the rear-projection screen between the projector and the rear-projection screen to improve the luminance of the screen by at least four corners. The sizes of the reflection mirrors in the four light path turning systems will not be limited as long as they can cover an angle range of light emitted by the projector corresponding to an region to be optimized (i.e., the target region).

With the rear-projection display system above, the loss of energy for the reflected light of the collimation lens layer can be controlled within 5%, which is far less than the loss of light energy ranging from 10% to 20% in the related art as illustrated in FIG. 1, thus improving the uniformity of luminance throughout the rear-projection screen.

The collimation lens layer can be made of an epoxy resin material or an optical glass material, and typically the collimation lens layer is made of an epoxy resin material and in a thickness ranging from 50 μm to 200 μm.

The rear-projection display system according to the embodiment of this disclosure will be described below in an embodiment thereof.

Figure 3:
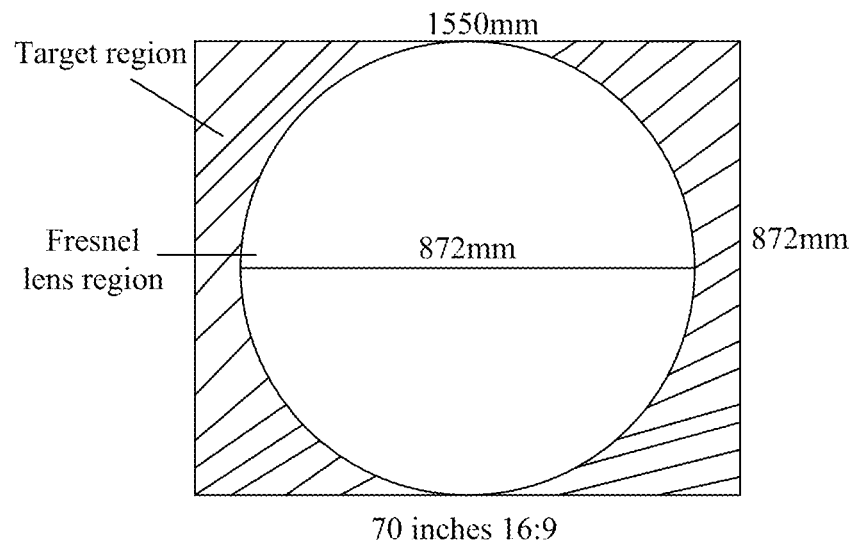
FIG. 3 is a front view of a collimation lens layer in accordance with some embodiments of this disclosure.

The rear-projection screen is a rectangle, the collimation lens layer is a rectangle shaped and sized the same as the rear-projection screen, and the target region on the collimation lens layer is other region on the collimation lens layer than the Fresnel lens region, where the Fresnel lens region is a circular region with a center being the center of the collimation lens layer, and a diameter being a preset length. Optionally the preset length is the width of the collimation lens layer. Referring to FIG. 3, there is a front view of the collimation lens layer according to the embodiment of this disclosure, where the size of the collimation lens layer is 70 inches, and the aspect ratio thereof is 16:9. The length thereof is 1550 mm, and the width thereof is 872 mm. The Fresnel lens region is a circle with a diameter of 872 mm, and the target region is other region on the collimation lens layer than the target circular region; and the projection ratio of the projector is 0.68.

Figure 5:
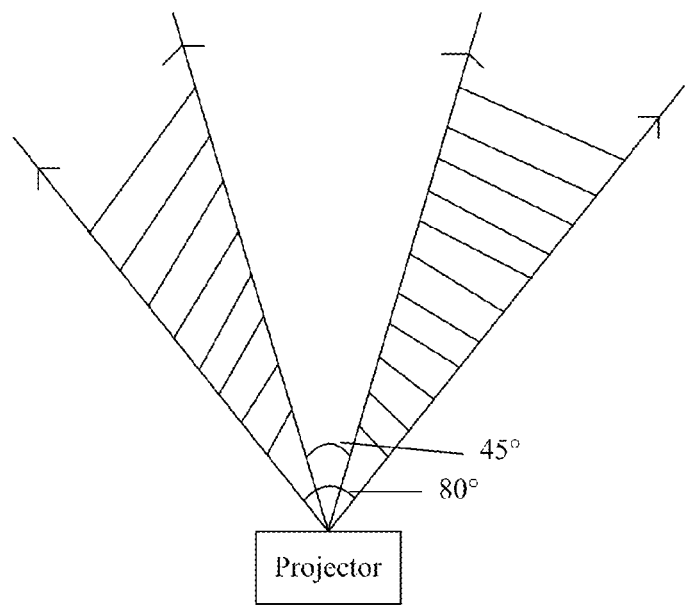
FIG. 5 is a schematic diagram of a light path turning system arrangement in a full angle in accordance with some embodiments of this disclosure.

As calculated, the light path turning system shall be so arranged that the angle between the light path turning system, and the optical axis of the projector ranges from 22.5° to 40°. As illustrated in FIG. 4, there is a schematic diagram of the light path turning system arrangement in half an angle. Of course, this is half an angle, and if take the angle range of the light emitted by the projector as an example, then the light path turning system can be arranged in the angle range from 45° to 80° with the optical axis being a symmetry axis. As illustrated in FIG. 5, there is a schematic diagram of the light path turning system arrangement in a full angle, where the light path turning system can be arranged in the shaded region in FIG. 5.

In the embodiment of this disclosure illustrated in FIG. 3, the area of the target region is approximately 56% of the area of the entire rear-projection screen (or the collimation lens layer), and the area of this region is preset as a function of the area of the rear-projection screen, and the projection ratio of the projector (or the focus length of the projector), and optionally the area of the target region is in inverse proportion to the projection ratio of the projector, and the area of the Fresnel lens region is in direct proportion to the projection ratio of the projector; and optionally the projection ratio of the projector is more than or equal to 0.4, and the area of the Fresnel lens region is less than or equal to 100 inches, so the proportion of the target region is less than or equal to 60%, and a better effect of optimizing the uniformity of luminance throughout the rear-projection screen can be achieved with this proportion.

Figure 6:
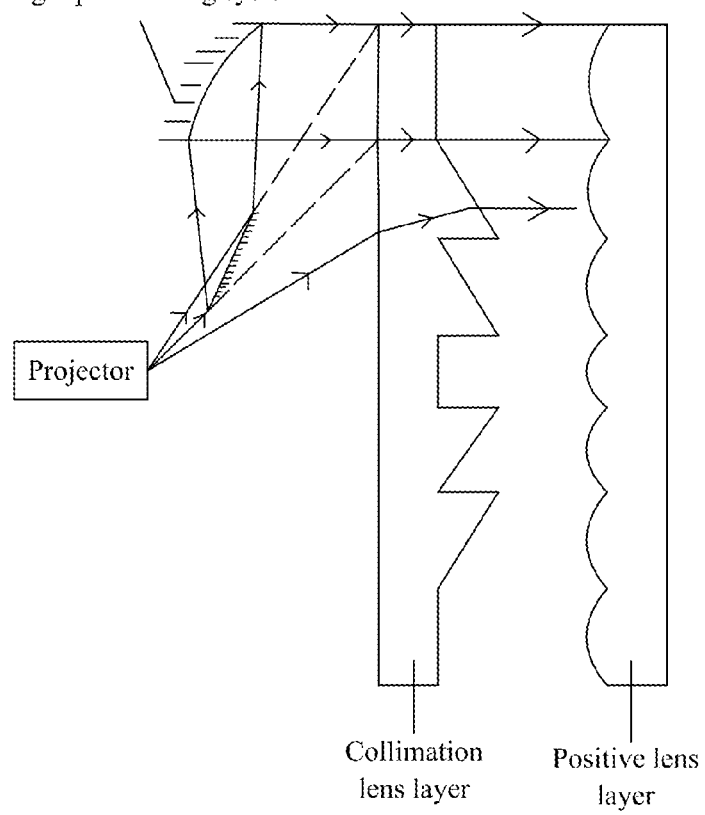
FIG. 6 is a schematic diagram of a rear-projection display system in accordance with some embodiments of this disclosure.

As illustrated in FIG. 6, the rear-projection screen in the rear-projection display system according to the embodiment of this disclosure further includes a positive lens layer located on the side of the Fresnel lens layer away from the projector, and configured to receive the light exiting the collimation lens layer, and to converge the light exiting the collimation lens layer, and then have it exit while diverging, where the positive lens layer is a column lens layer or a glass micro-bead layer.

Based upon the same idea as the embodiments above, some embodiments of this disclosure further provide a rear-projection screen including a collimation lens layer including a target region and a Fresnel lens region, where the Fresnel lens region receives first projected light directly from the projector, and the target region receives second projected light from the projector processed by N light path turning systems; and the target region is arranged outside the Fresnel lens region, and emergent light exiting the target region is parallel to the normal of the collimation lens layer;

Where an emitting angle of the first projected light is lower than a first preset threshold, and an emitting angle of the second projected light is above or equal to the first preset threshold, and the second projected light processed by the N light path turning systems is incident onto the target region at a first angle less than the emitting angle of the second projected light.

In some embodiments, when the first angle is 0°, then the target region is arranged as a planar transmitting layer; or when the first angle is more than 0°, then the target region is arranged as a Fresnel lens layer.

In some embodiments, the Fresnel lens region is a circular region with a center being the center of the collimation lens layer, and a diameter being a preset length.

In some embodiments, the area of the target region is in inverse proportion to the projection ratio of the projector, and the area of the Fresnel lens region is in direct proportion to the projection ratio of the projector.

In some embodiments, the target region includes four sub-target regions which are edge regions of the collimation lens layer.

In some embodiments, the rear-projection screen further includes a positive lens layer located on the light emergent side of the collimation lens layer.

In the embodiments of this disclosure, the rear-projection display system includes the projector, the N light path turning systems, and the rear-projection screen including the collimation lens layer including the target region and the Fresnel lens region, where the N light path turning systems are configured to have the second projected light, projected by the projector (the second projected light is light with the emitting angle above the preset threshold), be incident onto the target region at the first angle less than the emitting angle of the second projected light, and the first angle is the angle between the light exiting the N light path turning systems to the target region, and the normal of the rear-projection screen. The loss of the reflected light can be reduced due to the less angle of the light incident onto the target region. Moreover the light exiting the target region is parallel to the normal of the collimation lens layer, so that the light exiting the collimation lens layer can exit in the same direction. In the embodiments of this disclosure, the N light path turning systems are introduced, and the optical structure of the target region of the Fresnel lens layer is altered, to thereby reduce the loss of the reflected light in the target region on the Fresnel lens layer so as to improve the uniformity of luminance throughout the rear-projection screen.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A rear-projection display system comprising a projector, N light path turning systems, and a rear-projection screen, wherein N is a positive integer;
the rear-projection screen including a collimation lens layer having a Fresnel lens region and a target region arranged outside the Fresnel lens region, and wherein emergent light exiting the target region is parallel to the normal of the collimation lens layer;
wherein the projector is configured to emit first projected light incident directly onto the Fresnel lens region, and emit second projected light incident onto the N light path turning systems, wherein the first projected light emitted by the projector and an optical axis of the projector define a first emitting angle therebetween, wherein the first emitting angle is less than a first preset threshold, wherein the second projected light emitted by the projector and the optical axis of the projector define a second emitting angle therebetween, and wherein the second emitting is greater than or equal to the first preset threshold; and
wherein the N light path turning systems are configured to receive the second projected light emitted by the projector, and provide the second projected light incident onto the target region at a first angle less than the second emitting angle.

2. The rear-projection display system of claim 1, wherein when the first angle is 0°, the target region is arranged as a planar transmitting layer; or
wherein when the first angle is more than 0°, the target region is arranged as a Fresnel lens layer.

3. The rear-projection display system of claim 1, wherein the Fresnel lens region is a circular region with a center aligned with a center of the collimation lens layer, and a diameter having a preset length.

4. The rear-projection display system of claim 3, wherein the target region includes an area inversely proportional to a projection ratio of the projector, and wherein the Fresnel lens region includes an area directly proportional to the projection ratio of the projector.

5. The rear-projection display system of claim 1, wherein each of the N light path turning systems comprises at least two reflection mirrors.

6. The rear-projection display system of claim 5, wherein the at least two reflection mirrors of said each of the N light path turning systems comprise a first reflection mirror configured to receive light, whose angle with respect to the optical axis of the projector is in a third angle range, among the projected light of the projector, and a second reflection mirror configured to receive reflected light from the first reflection mirror, and reflect the reflected light to the target region.

7. The rear-projection display system of claim 6, wherein the third angle range is greater than or equal to an angle between the light projected by the projector to an inner edge of the target region and the optical axis of the projector, and less than or equal to an angle of the light projected by the projector to an outer edge of the target region and the optical axis of the projector, wherein the inner edge of the target region is a boundary between the target region and the Fresnel lens region, and wherein the outer edge of the target region is an outer edge of the rear-projection screen.

8. The rear-projection display system of claim 6, wherein the first reflection mirror in said each of the N light path turning systems is a planar reflection mirror, and the second reflection mirror in said each of the N light path turning systems is a concave reflection mirror; or
wherein the first reflection mirror in said each of the N light path turning systems is a concave reflection mirror, and the second reflection mirror in said each of the N light path turning systems is a planar reflection mirror.

9. The rear-projection display system of claim 1, wherein the projector is located on a straight line passing through a center of the rear-projection screen, and perpendicular to the rear-projection screen, wherein the N light path turning systems include four light path turning systems, wherein the target region comprises four sub-target regions corresponding to the four light path turning systems.

10. The rear-projection display system of claim 9, wherein the four sub-target regions define edge regions of the collimation lens layer.

11. The rear-projection display system of claim 1, wherein the projector, the N light path turning systems, and the rear-projection screen are located in a housing, and wherein the N light path turning systems are fixed on an inner wall of the housing.

12. The rear-projection display system of claim 1, wherein the first preset threshold is an angle between light projected by the projector to an inner edge of the target region and the optical axis of the projector, and wherein the inner edge of the target region is a boundary between the target region and the Fresnel lens region.

13. The rear-projection display system of claim 1, wherein the rear-projection screen further comprises a positive lens layer located on a light emergent side of the collimation lens layer.

14. A rear-projection screen comprising:
a collimation lens layer including a Fresnel lens region configured to receive first projected light directly from a projector, a target region configured to receive second projected light from the projector processed by N light path turning systems, the Fresnel lens region including a circular region having a center aligned with a center of the collimation lens layer and a diameter with a preset length, the target region arranged outside the Fresnel lens region, the target region including an area inversely proportional to a projection ratio of the projector, the Fresnel lens region including an area directly proportional to the projection ratio of the projector, wherein emergent light exiting the target region is parallel to the normal of the collimation lens layer, wherein the first projected light emitted by the projector and an optical axis of the projector define a first emitting angle therebetween, wherein the first emitting angle is less than a first preset threshold, wherein the second projected light emitted by the projector and the optical axis of the projector define a second emitting angle therebetween, wherein the second emitting angle is greater than or equal to the first preset threshold, and wherein the second projected light processed by the N light path turning systems is incident onto the target region at a first angle less than the second emitting angle.

15. The rear-projection screen of claim 14, wherein when the first angle is 0°, the target region is arranged as a planar transmitting layer; or
wherein when the first angle is more than 0°, the target region is arranged as a Fresnel lens layer.

16. The rear-projection screen of claim 14, wherein the target region comprises four sub-target regions defining edge regions of the collimation lens layer.

17. The rear-projection screen of claim 14, further comprising a positive lens layer located on a light emergent side of the collimation lens layer.

18. A rear-projection screen comprising:
a collimation lens layer including a target region and a Fresnel lens region, the Fresnel lens region configured to receive first projected light from a projector, the target region configured to receive second projected light from the projector processed by N light path turning systems, the Fresnel lens region including a circular region having a center aligned with a center of the collimation lens layer and a diameter with a preset length, the target region including an area inversely proportional to a projection ratio of the projector, and the Fresnel lens region including an area directly proportional to the projection ratio of the projector, the first projected light emitted by the projector and an optical axis of the projector defining a first emitting angle therebetween, wherein N is a positive integer, wherein a value of the first emitting angle is lower than a first preset threshold, the second projected light emitted by the projector and the optical axis of the projector defining a second emitting angle therebetween, wherein a value of the second emitting angle is above or equal to the first preset threshold, and wherein the second projected light processed by the N light path turning systems is incident onto the target region at a first angle less than the second emitting angle.

* * * * *